(12) United States Patent
Zhao et al.

(10) Patent No.: US 11,847,265 B2
(45) Date of Patent: *Dec. 19, 2023

(54) METHOD AND APPARATUS FOR CONTROLLING ONBOARD SYSTEM

(71) Applicant: Huawei Technologies Co., Ltd., Shenzhen (CN)

(72) Inventors: Xinyu Zhao, Dongguan (CN); Chengping Liu, Dongguan (CN); Heshuai Si, Dongguan (CN); Yongfang Su, Shenzhen (CN); Zeshi Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,731

(22) Filed: Jan. 18, 2022

(65) Prior Publication Data

US 2022/0137715 A1    May 5, 2022

Related U.S. Application Data

(63) Continuation of application No. 17/120,641, filed on Dec. 14, 2020, now Pat. No. 11,275,449, which is a
(Continued)

(30) Foreign Application Priority Data

Feb. 27, 2017    (CN) .......................... 201710106795.8

(51) Int. Cl.
*G06F 3/01*    (2006.01)
*G01S 7/539*    (2006.01)
(Continued)

(52) U.S. Cl.
CPC .............. *G06F 3/017* (2013.01); *G01S 7/539* (2013.01); *B60K 37/06* (2013.01);
(Continued)

(58) Field of Classification Search
CPC ............ B60K 37/06; B60K 2370/1434; B60K 2370/146; B60K 2370/1468;
(Continued)

(56) References Cited

U.S. PATENT DOCUMENTS 10,775,938 B2    9/2020  Tang et al.
2011/0148798 A1   6/2011  Dahl
(Continued)

FOREIGN PATENT DOCUMENTS

CN    103699224 A    4/2014
CN    104276201 A    1/2015
(Continued)

OTHER PUBLICATIONS

Zhiwei, H., et al., "Application Design and Practice of ARM Embedded System Application in National College Students Electronic Design Competition," Jan. 2011, 14 pages.

*Primary Examiner* — Nelson M Rosario
(74) *Attorney, Agent, or Firm* — Conley Rose, P.C.

(57) ABSTRACT

A method and an apparatus for controlling an onboard system includes determining, using a sensor mounted in a steering wheel, a track of a current gesture of a driver in a process of holding, by the driver, the steering wheel; determining a type of the current gesture from preset gesture types based on the track of the current gesture; and controlling the onboard system to perform an operation corresponding to the type of the current gesture.

20 Claims, 8 Drawing Sheets

Slide two fingers inward or outward

Related U.S. Application Data continuation of application No. 16/550,950, filed on Aug. 26, 2019, now Pat. No. 10,884,510, which is a continuation of application No. PCT/CN2017/101846, filed on Sep. 15, 2017.

(51) Int. Cl.
  *B60K 37/06* (2006.01)
  *B62D 1/06* (2006.01)

(52) U.S. Cl.
  CPC .................. *B60K 2370/146* (2019.05); *B60K 2370/1529* (2019.05); *B60K 2370/48* (2019.05); *B60K 2370/52* (2019.05); *B62D 1/06* (2013.01)

(58) Field of Classification Search
  CPC ........ B60K 2370/1529; B60K 2370/48; B60K 2370/52; B60K 2370/782; G01S 7/539; G06F 3/017; G06F 3/0346; B62D 1/06
  See application file for complete search history.

(56) References Cited

U.S. PATENT DOCUMENTS

| | | | |
|---|---|---|---|
| 2013/0024071 A1 | 1/2013 | Sivertsen | |
| 2014/0022070 A1* | 1/2014 | Golomb | B60Q 1/0082 340/475 |
| 2015/0066245 A1 | 3/2015 | Lee et al. | |
| 2015/0165479 A1 | 6/2015 | Lasiter et al. | |
| 2015/0291032 A1 | 10/2015 | Kim et al. | |
| 2016/0027276 A1 | 1/2016 | Freeck et al. | |
| 2016/0054914 A1 | 2/2016 | Di Censo et al. | |
| 2016/0185385 A1 | 6/2016 | Di Censo et al. | |
| 2016/0349850 A1 | 12/2016 | Tsuda | |
| 2018/0052541 A1 | 2/2018 | Hoggarth et al. | |
| 2018/0232639 A1 | 8/2018 | Lin et al. | |
| 2019/0354238 A1 | 11/2019 | Akhbari et al. | |

FOREIGN PATENT DOCUMENTS

| | | |
|---|---|---|
| CN | 105182803 A | 12/2015 |
| CN | 105260024 A | 1/2016 |
| CN | 105373230 A | 3/2016 |
| CN | 105389003 A | 3/2016 |
| CN | 105530365 A | 4/2016 |
| CN | 105607770 A | 5/2016 |
| CN | 105739679 A | 7/2016 |
| CN | 106289299 A | 1/2017 |
| EP | 2870528 B1 | 3/2018 |
| JP | H03232085 A | 10/1991 |
| JP | H08254431 A | 10/1996 |
| JP | 2004138481 A | 5/2004 |
| JP | 2010165029 A | 7/2010 |
| JP | 2011522271 A | 7/2011 |
| JP | 2013093064 A | 5/2013 |
| JP | 2013218391 A | 10/2013 |
| JP | 2014038409 A | 2/2014 |
| JP | 2015531719 A | 11/2015 |
| JP | 2017503255 A | 1/2017 |
| KR | 20140079025 A | 6/2014 |
| KR | 101500130 B1 | 3/2015 |
| WO | 2015133057 A1 | 9/2015 |

* cited by examiner

100

Determine, by using a sensor mounted in a steering wheel, a track of a current gesture of a driver in a process of holding, by the driver, the steering wheel ~110

Determine a type of the current gesture in preset gesture types based on the track of the current gesture ~120

Control an onboard system to perform an operation corresponding to the type of the current gesture ~130

FIG. 1

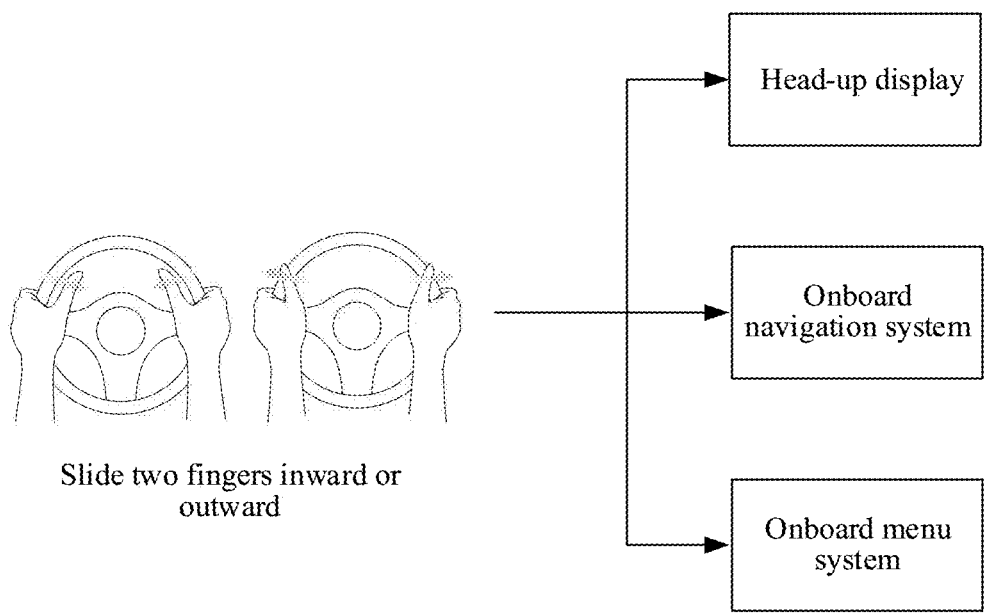

Slide two fingers inward or outward

FIG. 2

FPC

METHOD AND APPARATUS FOR CONTROLLING ONBOARD SYSTEM

CROSS-REFERENCE TO RELATED APPLICATIONS

This is a continuation of U.S. patent application Ser. No. 17/120,641 filed on Dec. 14, 2020, which is a continuation of U.S. patent application Ser. No. 16/550,950 filed on Aug. 26, 2019, now U.S. Pat. No. 10,884,510, which is a continuation of International Patent Application No. PCT/CN2017/101846 filed on Sep. 15, 2017, which claims priority to Chinese Patent Application No. 201710106795.8 filed on Feb. 27, 2017. The disclosures of the aforementioned patent applications are hereby incorporated by reference in their entireties.

TECHNICAL FIELD

Embodiments of the present disclosure relate to the field of vehicle electronics, and more specifically, to a method and an apparatus for controlling an onboard system.

BACKGROUND

With continuous improvement in vehicle safety standards and vehicle electronization levels and increasing requirements of people for driving safety, steady growth in a vehicle electronic market is greatly promoted.

In a conventional vehicle, to implement different functions, for example, to implement functions such as switching, playing, or pausing of songs when music is played, or to implement a function such as controlling a size of a map on an onboard display screen when onboard navigation is displayed, different function operations need to be implemented by using function keys disposed on a steering wheel, an onboard center console, or other positions. However, positions of the function keys on the steering wheel, the onboard center console, or the other positions are fixed, and cannot be adjusted, a quantity of the function keys is large, and some function keys are relatively distant from a position of the steering wheel, and so on. Therefore, a driver needs to be distracted to perform a corresponding operation when driving a vehicle, and there is a risk of a traffic accident. Therefore, for vehicle electronics, a safer, more reliable, and simpler operation method is needed in human-computer interaction.

SUMMARY

Embodiments of the present disclosure provide a method and an apparatus for controlling an onboard system. Types of some gestures performed by a driver are identified by using a sensor mounted in a steering wheel, and operations corresponding to different types of gestures are performed on the onboard system based on the types of the gestures such that some function operation requirements of the driver during driving of a vehicle are desirably met, driving safety is ensured, and interaction between the vehicle and a human is closer.

According to one aspect, a method for controlling an onboard system is provided. The method includes determining, by using a sensor mounted in a steering wheel, a track of a current gesture of a driver in a process of holding, by the driver, the steering wheel; determining a type of the current gesture from preset gesture types based on the track of the current gesture; and controlling the onboard system to perform an operation corresponding to the type of the current gesture.

In this embodiment of the present disclosure, when the driver holds the steering wheel by using a hand, types of some gestures performed by the driver may be identified by using the sensor mounted in the steering wheel, and operations corresponding to different types of gestures are performed on the onboard system based on the types of the gestures such that some function operation requirements of the driver during driving of a vehicle are desirably met, driving safety is ensured, and interaction between the vehicle and a human is closer.

With reference to the first aspect, in a first implementation of the first aspect, a plurality of sensors are mounted in the steering wheel. The plurality of sensors are a plurality of ultrasonic sensors. The determining a track of a current gesture of a driver by using a sensor mounted in a steering wheel includes obtaining ultrasonic signals collected by the plurality of ultrasonic sensors within a period of time; selecting a reflected signal from the collected ultrasonic signals; and positioning a hand or a finger of the driver within a period of time based on the selected reflected signal, to determine the track of the current gesture.

In this embodiment of the present disclosure, the reflected signal is determined in the ultrasonic signals, to accurately determine the track of the current gesture.

With reference to the first aspect or the first implementation of the first aspect, in a second implementation of the first aspect, before the determining a track of a current gesture of a driver by using a sensor mounted in a steering wheel, the method further includes determining whether the steering wheel is in a rotation state. The determining a track of a current gesture of a driver by using a sensor mounted in a steering wheel includes determining, when the steering wheel is in a non-rotation state, the track of the current gesture of the driver by using the sensor mounted in the steering wheel.

With reference to any one of the first aspect or the first and the second implementations of the first aspect, in a third implementation of the first aspect, a gyroscope is mounted in the steering wheel. The determining whether the steering wheel is in a rotation state includes determining, based on the gyroscope, whether the steering wheel is in the rotation state.

In this embodiment of the present disclosure, whether the steering wheel is in the rotation state is determined, to avoid identifying a gesture of the driver when the steering wheel is in the rotation state, and ensure precision of gesture identification.

With reference to any one of the first aspect, or the first to the third implementations of the first aspect, in a fourth implementation of the first aspect, the preset gesture types include at least one of the following gesture types such as sliding two fingers inward or outward; sliding two fingers clockwise or anticlockwise; sliding one finger upward, downward, leftward, and rightward; double-clicking with one finger; waving one hand; touching and sliding one finger along an inner side of circumference of the steering wheel; and double-clicking with two fingers.

With reference to any one of the first aspect or the first to the fourth implementations of the first aspect, in a fifth implementation of the first aspect, the circumference of the steering wheel is provided with a plurality of sound holes. The plurality of sound holes are in one-to-one correspondence with the plurality of ultrasonic sensors. Directions of the sound holes are determined based on an active area of a hand or a finger of the driver and coverage of the ultrasonic signals.

With reference to the fifth implementation of the first aspect, in a sixth implementation of the first aspect, a waterproof ventilation film is disposed between the ultrasonic sensors and the sound holes. The waterproof ventilation film is configured to prevent water vapor from entering the ultrasonic sensors through the sound holes.

In this embodiment of the present disclosure, the waterproof ventilation film can prevent the water vapor from entering the ultrasonic sensors, to ensure precision of gesture identification.

According to a second aspect, an apparatus for controlling an onboard system is provided. The apparatus includes a first determining module configured to determine, by using a sensor mounted in a steering wheel, a track of a current gesture of a driver in a process of holding, by the driver, the steering wheel; a second determining module configured to determine a type of the current gesture from preset gesture types based on the track of the current gesture; and a control module configured to control the onboard system to perform an operation corresponding to the type of the current gesture.

With reference to the second aspect, in a first implementation of the second aspect, a plurality of sensors are mounted in the steering wheel. The plurality of sensors are a plurality of ultrasonic sensors. The first determining module is further configured to obtain ultrasonic signals collected by the plurality of ultrasonic sensors within a period of time; select a reflected signal from the collected ultrasonic signals; and position a hand or a finger of the driver within a period of time based on the selected reflected signal, to determine the track of the current gesture.

With reference to the second aspect or the first implementation of the second aspect, in a second implementation of the second aspect, the apparatus further includes a third determining module configured to determine whether the steering wheel is in a rotation state. The first determining module is further configured to determine, when the steering wheel is in a non-rotation state, the track of the current gesture of the driver by using the sensor mounted in the steering wheel.

With reference to any one of the second aspect or the first and the second implementations of the second aspect, in a third implementation of the second aspect, a gyroscope is mounted in the steering wheel. The third determining module is further configured to determine, based on the gyroscope, whether the steering wheel is in the rotation state.

With reference to any one of the second aspect, or the first to the third implementations of the second aspect, in a fourth implementation of the second aspect, the preset gesture types include at least one of the following gesture types such as sliding two fingers inward or outward; sliding two fingers clockwise or anticlockwise; sliding one finger upward, downward, leftward, and rightward; double-clicking with one finger; waving one hand; touching and sliding one finger along an inner side of circumference of the steering wheel; and double-clicking with two fingers.

With reference to any one of the second aspect, or the first to the fourth implementations of the second aspect, in a fifth implementation of the second aspect, the circumference of the steering wheel is provided with a plurality of sound holes. The plurality of sound holes are in one-to-one correspondence with the plurality of ultrasonic sensors. Directions of the sound holes are determined based on an active area of a hand or a finger of the driver and coverage of the ultrasonic signals.

With reference to the fifth implementation of the second aspect, in a sixth implementation of the second aspect, a waterproof ventilation film is disposed between the ultrasonic sensors and the sound holes. The waterproof ventilation film is configured to prevent water vapor from entering the ultrasonic sensors through the sound holes.

According to a third aspect, an apparatus for controlling an onboard system is provided. The apparatus includes a memory and a processor. The memory is configured to store program code. The processor is configured to invoke the program code to implement the method according to the first aspect and the implementations of the first aspect.

According to a fourth aspect, a computer-readable storage medium is provided. The computer-readable storage medium stores an instruction. When the instruction is run on a computer, the computer is enabled to perform the method according to the foregoing aspects.

In the embodiments of the present disclosure, types of some gestures performed by the driver may be identified by using the sensor mounted in the steering wheel, and operations corresponding to different types of gestures are performed on the onboard system based on the types of the gestures such that different operations of the driver on the onboard system are implemented, the driver is greatly facilitated, and driving safety is ensured.

BRIEF DESCRIPTION OF DRAWINGS

FIG. 1 is a schematic flowchart of a method for controlling an onboard system according to an embodiment of the present disclosure;

FIG. 2 is a schematic diagram of application of a first gesture according to an embodiment of the present disclosure;

DESCRIPTION OF EMBODIMENTS

Figure 3:
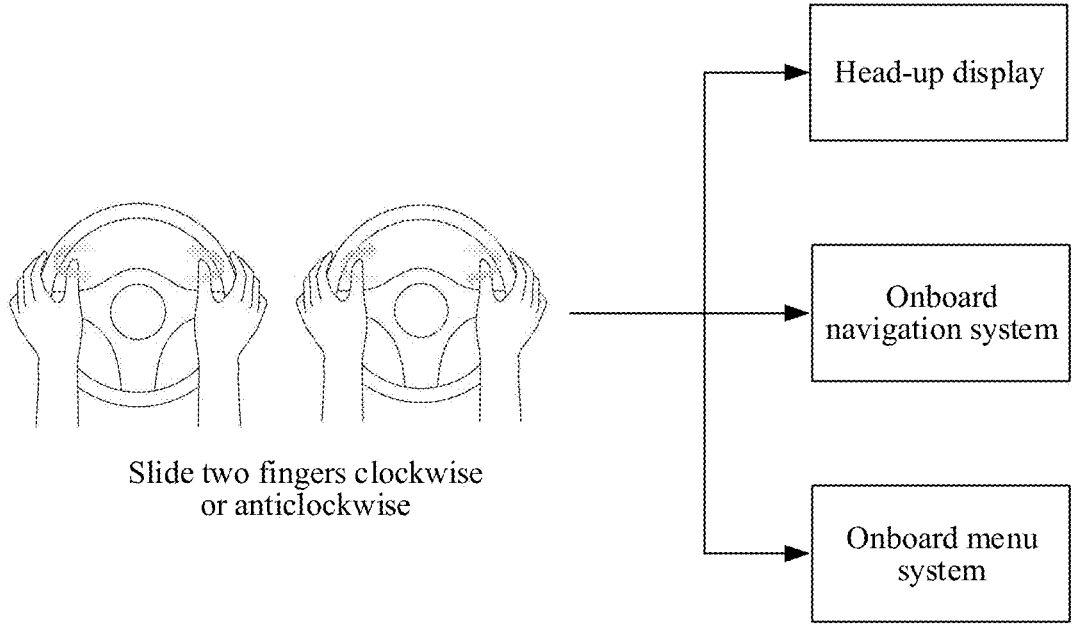
FIG. 3 is a schematic diagram of application of a second gesture according to an embodiment of the present disclosure.

The following describes technical solutions in embodiments of the present disclosure with reference to accompanying drawings.

In a conventional vehicle, a driver needs to implement different function operations by using different function keys. For example, a function such as volume adjustment during multimedia playback is implemented by using a key on a steering wheel, in a vehicle having an onboard phone, a key on a steering wheel may further implement a function such as answering the phone, or a navigation display function, an in-car temperature adjustment function, or other functions can be implemented by using a key on an onboard center console. However, there are many function keys in the vehicle, positions of the function keys are fixed, positions of many function keys are relatively distant from the driver, and so on. Therefore, during normal driving of the driver, if the driver needs to perform operations on some function keys, the driver may be distracted, and a traffic accident is easily caused.

To resolve the foregoing problem, an embodiment of the present disclosure provides a method for controlling an onboard system. A gesture of a driver is identified by using a sensor mounted in a steering wheel such that some function operations needed by the driver during driving of a vehicle can be conveniently and fast implemented, and interaction between the vehicle and a human becomes closer.

FIG. 1 is a schematic flowchart of a method 100 for controlling an onboard system according to an embodiment of the present disclosure. The method 100 shown in FIG. 1 includes some or all of the following steps.

110: Determine, by using a sensor mounted in a steering wheel, a track of a current gesture of a driver in a process of holding, by the driver, the steering wheel.

120: Determine a type of the current gesture from preset gesture types based on the track of the current gesture.

130: Control the onboard system to perform an operation corresponding to the type of the current gesture.

Further, when the driver holds the steering wheel by using a hand, types of gestures performed by the driver may be identified by using the sensor mounted in the steering wheel, and operations corresponding to different types of gestures are performed on the onboard system based on the types of the gestures. In the entire process, the hand of the driver may remain in a state of holding the steering wheel, some gestures need to be performed using only some fingers or one hand of the driver such that different function operations can be implemented, some function operation requirements of the driver during driving of a vehicle are desirably met, driving safety is ensured, and interaction between the vehicle and a human is closer.

It should be understood that the onboard system in this embodiment of the present disclosure may be an onboard head-up display (HUD), or may be an onboard navigation system, an onboard menu system, and an onboard multimedia system, or another onboard system. This is not limited in this embodiment of the present disclosure.

Optionally, in some embodiments, the sensor may be mounted on circumference of the steering wheel.

Optionally, in some embodiments, there may be a plurality of sensors. The plurality of sensors are connected in series to form a sensor array.

It should be understood that a specific quantity of the sensors may be determined by a size of the steering wheel, or may be determined by precision needed for gesture identification. For example, when a gesture performed by the driver needs to be precisely identified, the quantity of the sensors may be properly increased.

Optionally, in some embodiments, the sensor may be an ultrasonic sensor.

Optionally, in some embodiments, there may also be a plurality of ultrasonic sensors. A specific quantity of the plurality of ultrasonic sensors may be determined by a size of the steering wheel, or may be determined by precision of gesture identification. The plurality of ultrasonic sensors are connected in series to form an ultrasonic sensor array.

It should be understood that in this embodiment of the present disclosure, a gesture performed by the driver is positioned according to an ultrasonic multipoint positioning principle, to identify the gesture. Therefore, the quantity of the ultrasonic sensors is at least two.

It should be understood that when the sensor is the ultrasonic sensor, the ultrasonic sensor may be used as a transmit end, or may be used as a receive end.

Optionally, in some embodiments, when the sensor is the ultrasonic sensor, ultrasonic signals received by the ultrasonic sensor may include a signal of a gesture performed by the driver, and may also include some other interference signals, for example, a noise signal of a fixed engine and a noise signal of another mechanical structure, and a signal having another frequency that is sent by a non-ultrasonic sensor.

Optionally, in some embodiments, ultrasonic signals received by a receive end of the ultrasonic sensor may be ultrasonic signals within a period of time, for example, may be ultrasonic signals within sampling time periods. In this way, a problem that a volume of data needing to be processed is relatively large and it is difficult to process the data can be avoided.

Optionally, in some embodiments, a parameter of the sampling time periods may be preset in the ultrasonic sensor. A user may freely set a length of the sampling time periods, or preset a length of the sampling time periods in the ultrasonic sensor based on a signal velocity.

It should be understood that the sampling time periods may be continuous, or may have an interval.

When the sampling time periods are continuous, when a time of ultrasonic signals received by the ultrasonic sensor reaches a sampling time period, a unit for storing data in the ultrasonic sensor may automatically transmit the ultrasonic signal collected in the sampling time period to a processor, and empty the ultrasonic signal in the storage unit, or when the storage unit does not need to process a currently collected data signal, the storage unit may directly delete the ultrasonic signal received in the sampling time period, to prepare to store an ultrasonic signal collected in a next sampling time period.

When the sampling time periods have an interval, an interrupt may be set in the ultrasonic sensor for implementation. When a sampling time reaches a current sampling time period, a unit for storing data in the ultrasonic sensor may also automatically transmit ultrasonic signals in the sampling time period to a processor, and empty the ultrasonic signals in the storage unit. Within an internal time between two sampling time periods, the ultrasonic sensor may not transmit an ultrasonic signal. When a next sampling time period reaches, the interrupt in the ultrasonic sensor is woken up. The ultrasonic sensor starts to transmit and receive ultrasonic signals. This manner can prevent the ultrasonic signal from being in a working state for a long time, and reduce energy consumption of the ultrasonic sensor.

The interrupt time interval may be set by the user, or may be preset in the ultrasonic sensor. This is not limited in this embodiment of the present disclosure.

Optionally, in some embodiments, after the ultrasonic sensor receives ultrasonic signals, reflected signals may be determined in the ultrasonic signals. For example, propagation distances of the ultrasonic signals may be determined based on phase differences and delay parameters of the ultrasonic signals, and the reflected signals in the ultrasonic signals are finally determined based on the different signal propagation distances in the ultrasonic signals. The reflected signals are wanted signals for identifying gestures performed by the driver.

Optionally, in some embodiments, some of the reflected signals may be signals out of an active area of a hand or a finger of the driver. The signals out of the active area of the hand or the finger of the driver cause interference to identification of gestures of the driver. Therefore, a reflected signal within the active area of the hand or the finger of the driver may further be determined based on a phase difference and a delay parameter of the reflected signal. The reflected signal within the active area of the hand or the finger of the driver is a signal required for final identification of the gestures.

Optionally, in some embodiments, before a reflected signal is determined in ultrasonic signals, the method 100 further includes, when a receive end of an ultrasonic sensor receives an ultrasonic signal, first predetermining the received ultrasonic signal, storing the received ultrasonic signal when a time length from sending the ultrasonic signal and receiving the ultrasonic signal meets a preset condition, and skipping storing, by the ultrasonic sensor, the current ultrasonic signal when the preset condition is not met, and re-receiving an ultrasonic signal in a next time period and pre-determining the ultrasonic signal. The preset condition may be a time threshold preset by the user. When a time length from transmitting an ultrasonic signal to receiving the ultrasonic signal is greater than the preset time threshold, it may be determined that the ultrasonic signal satisfies the preset condition.

In this embodiment of the present disclosure, through the step of predetermining, some of received ultrasonic signals that directly enter the receive end of the ultrasonic sensor without being reflected may be removed in advance such that a gesture identification time is reduced, and gesture identification efficiency is improved.

It should be understood that, through the step of predetermining, some of ultrasonic signals may be removed, but not all signals that are not reflected in the ultrasonic signals can be removed. The step is only predetermining. When it is determined that an ultrasonic signal does not meet the preset condition, the received ultrasonic signal is not further processed, and gesture identification efficiency is improved.

Optionally, in some embodiments, before the ultrasonic signal received by the receive end of the ultrasonic sensor is predetermined, the method 100 further includes determining whether the steering wheel is in a rotation state, and identifying, if the steering wheel is in a non-rotation state, the gesture of the driver using the sensor mounted in the steering wheel.

It should be understood that usually, the steering wheel is in the rotation state because the driver operates the steering wheel, for example, operates the steering wheel when making a turn or changing a lane. In this case, a probability of operation of the driver on the onboard system is very low. In addition, when the driver operates the steering wheel, placing positions of hands of the driver may affect identification of the sensor for the gesture. Therefore, when the steering wheel is in the rotation state, the gesture of the driver is not identified.

Optionally, in some embodiments, the determining whether the steering wheel is in a rotation state may be performed by a gyroscope disposed in the steering wheel. Further, whether the steering wheel is in the rotation state may be determined based on data information obtained by the gyroscope.

Optionally, in some embodiments, the ultrasonic signals received by the ultrasonic sensor further include other interference signals. Therefore, to more efficiently and accurately identify the gesture of the driver, before the reflected signal is determined in the ultrasonic signals, the interference signals in the ultrasonic signals further need to be removed.

Optionally, in some embodiments, the ultrasonic signals received by the ultrasonic sensor may include some interference signals having natural frequencies, for example, sound of an engine and noise of another mechanical structure. The noise signals are signals having natural frequencies. Therefore, time domain and frequency domain transformation may be performed on the noise signals having the natural frequencies. Then, the noise signals having the natural frequencies are filtered out using a band-pass filter.

Optionally, in some embodiments, after the noise signals having the natural frequencies are filtered out, obtained ultrasonic signals may further include some other signals. The other signals are not sent by the ultrasonic sensor. Signals sent by the ultrasonic sensor are signals having natural frequencies. Therefore, frequencies of the other signals are different from those of the signals sent by the ultrasonic sensor. Time domain and frequency domain transformation may be performed on the frequencies of the other signals. Signals having other frequencies are filtered out using a band-pass filter.

It should be understood that there is no definite sequence between step of removing inherent noise signals and step of removing signals having other frequencies. In addition, in this embodiment of the present disclosure, only one of the two steps may be performed, or the two steps are both performed. Performing both the steps can remove all interference signals in the received ultrasonic signal, and ensure gesture identification accuracy. Therefore, this is used as an example in this embodiment of the present disclosure. However, this embodiment of the present disclosure is not limited thereto.

Optionally, in some embodiments, after the reflected signal is determined in the ultrasonic signals, the hand or the finger of the driver within the period of time may be positioned based on the reflected signal within the period of time. For example, coordinates of positions of the hand or the finger of the driver within the period of time may be determined according to the ultrasonic multipoint positioning principle.

Optionally, in some embodiments, after the hand or the finger of the driver within the period of time is positioned, the track of the current gesture of the driver may be determined based on obtained position information. For example, function fitting may be performed on the coordinates of the positions of the hand or the finger of the driver within the period of time, to obtain a fitted function curve. The fitted function curve is the track of the current gesture of the driver.

Optionally, in some embodiments, the type of the current gesture may be determined from the preset gesture types based on the determined track of the current gesture.

For example, the function curve of the track of the current gesture may be compared with function curves in a database, and a function curve having a highest matching degree with the function curve of the track of the current gesture is selected from the function curves in the database. A gesture type corresponding to the function curve having the highest matching degree is the type of the current gesture.

Optionally, in some embodiments, the preset gesture types may include at least one of the following gesture types:

sliding two fingers inward or outward;
sliding two fingers clockwise or anticlockwise;
sliding one finger upward, downward, leftward, and rightward;
double-clicking with one finger;
waving one hand;
touching and sliding one finger along an inner side of circumference of the steering wheel; and
double-clicking with two fingers.

It should be understood that the two fingers are a same finger of the left hand and the right hand. For example, sliding, by the two fingers, inward is sliding, by the thumb of the left hand and the thumb of the right hand, inward, and sliding, by the two fingers, clockwise is sliding, by the thumb of the left hand and the thumb of the right hand, clockwise. The one finger may be any finger of the left hand or the right hand, and the one hand may be either of the left hand or the right hand.

It should be further understood that when the driver drives the vehicle, hands are usually placed on the steering wheel, other fingers other than thumbs are usually in a state of holding the steering wheel, and the thumbs usually can freely move. Therefore, when a gesture is performed, most commonly used fingers should be the thumbs. Therefore, in this embodiment of the present disclosure, only the thumbs are used as an example to describe the various gestures in detail. However, this embodiment of the present disclosure is not limited thereto.

To facilitate management of the gesture types, the gesture of the sliding two fingers inward or outward in the foregoing gestures may be marked as a first gesture, the sliding two fingers clockwise or anticlockwise is marked as a second gesture, the sliding one finger upward, downward, leftward, and rightward is marked as a third gesture, the double-clicking with one finger is marked as a fourth gesture, the waving one hand is marked as a fifth gesture, the touching and sliding one finger along an inner side of circumference of the steering wheel is marked as a sixth gesture, and the double-clicking with two fingers is marked as a seventh gesture.

It should be understood that the description of the preset gesture types is not intended to limit preset gesture types. In a subsequent developing process, a research person may further add gestures for controlling other functions to the preset gesture types. In this embodiment of the present disclosure, only the seven gestures are used as an example to describe the preset gestures in detail. However, this embodiment of the present disclosure is not limited thereto.

FIG. 2 is a schematic diagram of application of a first gesture according to an embodiment of the present disclosure. The first gesture is sliding two fingers inward or outward, and can control a display size or a size of displayed content of the onboard system.

As shown in FIG. 2, the gesture of the sliding two fingers inward or outward is used to control an HUD, and can control a display size of the HUD, control a font size of information displayed on the HUD, or the like. For example, the gesture may be used to control a display size of the HUD on a windshield of the vehicle. Alternatively, when the driver needs to pay attention to fuel consumption information to determine whether a vehicle needs to refuel, the sliding two fingers outward in the gesture can enlarge the font size of the information, for example, fuel consumption and a vehicle speed, displayed on the HUD, to facilitate viewing of the driver.

As shown in FIG. 2, when the gesture of the sliding two fingers inward or outward is used to control an onboard navigation system, a size of a map displayed on an onboard central control display screen may be adjusted by performing the gesture. When some road statuses are complex or the vehicle needs to change lanes or make a turn, the sliding two fingers outward in the gesture can enlarge the map, to facilitate the driver to view a relatively small mark in the map at any time. When a road status is relatively good or when the vehicle drives on an expressway, the sliding two fingers inward in the gesture can reduce the map.

As shown in FIG. 2, when the gesture of the sliding two fingers inward or outward is used to control an onboard menu system, a font size of a menu on an onboard central control display screen may be adjusted by performing the gesture. For example, when the driver is an old person or has relatively poor eyesight, the sliding two fingers outward can enlarge the font of the menu of the onboard system to facilitate viewing of the driver.

FIG. 3 is a schematic diagram of application of a second gesture according to an embodiment of the present disclosure. The second gesture is sliding two fingers clockwise or anticlockwise, and can control transformation of a visual angle of displayed content in the onboard system.

As shown in FIG. 3, when the gesture of the sliding two fingers clockwise or anticlockwise is used to control a road status displayed on an HUD, the sliding two fingers clockwise or anticlockwise can adjust an inclination angle of display with reference to a road status displayed on the HUD.

As shown in FIG. 3, when the gesture of the sliding two fingers clockwise or anticlockwise is used to control an onboard navigation system, the sliding two fingers clockwise or anticlockwise can switch a map of the onboard navigation system to a top view, a front view, or views at other visual angles when the driver needs to view a specific building or a specific road status in the map.

Figure 4:
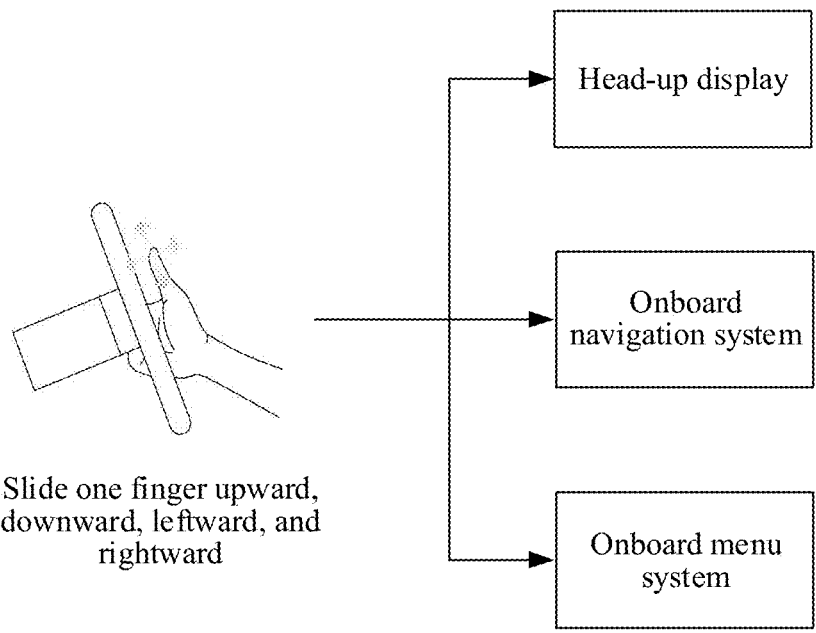
FIG. 4 is a schematic diagram of application of a third gesture according to an embodiment of the present disclosure.

FIG. 4 is a schematic diagram of application of a third gesture according to an embodiment of the present disclosure. The third gesture is sliding one finger upward, downward, leftward, and rightward, and can control a display position of the onboard system, and implement functions such as selection of an option of a menu or operation of an option in a multimedia system.

As shown in FIG. 4, when the gesture of the sliding one finger upward, downward, leftward, and rightward is used to control an HUD, a function of controlling a position of the HUD that is displayed on a windshield of a vehicle can be implemented. For example, the gesture of the sliding one finger upward, downward, leftward, and rightward can adjust the display position of the HUD based on a height of the driver and different eyeball positions of the driver in a cab.

As shown in FIG. 4, when the gesture of the sliding one finger upward, downward, leftward, and rightward is used to control an onboard navigation system, a function of controlling a position of a map displayed on an onboard central control display screen can be implemented. For example, one finger may slide upward to view some position information above a current position, one finger may slide leftward to view some position information on the left of a current position, and so on.

As shown in FIG. 4, when the gesture of the sliding one finger upward, downward, leftward, and rightward is used to control an onboard menu system, a function of selecting a specific option in a menu can be implemented. For example, one finger may slide downward to select a next option of a current option, one finger may slide rightward to select an option on the right of a current option, and so on.

As shown in FIG. 4, when the gesture of the sliding one finger upward, downward, leftward, and rightward is used to control a multimedia system, a function of controlling an operation of a specific option in the multimedia system can be implemented. For example, when the multimedia system is used to play music, the sliding one finger upward can control to play a previous song, the sliding one finger downward can control to play a next song, the sliding one finger leftward can reduce a volume, the sliding one finger rightward can increase the volume, and so on.

Figure 5:
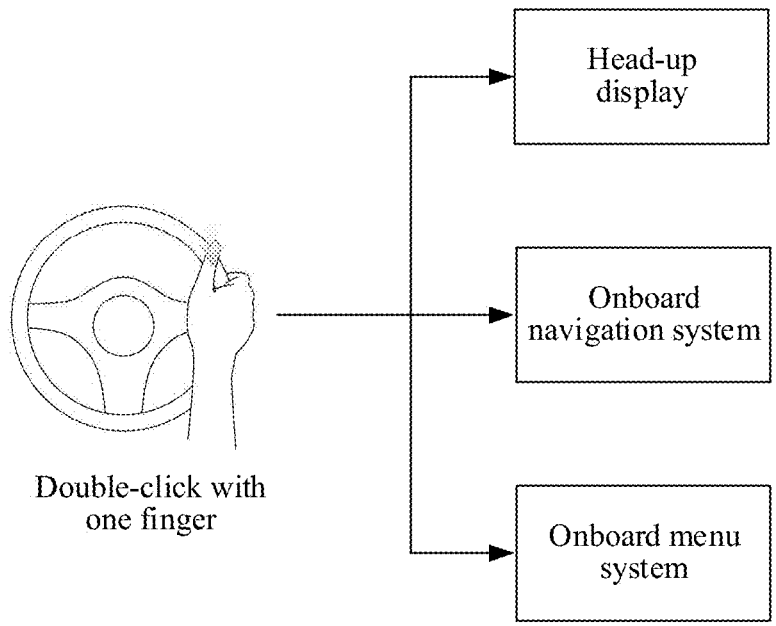
FIG. 5 is a schematic diagram of application of a fourth gesture according to an embodiment of the present disclosure.

FIG. 5 is a schematic diagram of application of a fourth gesture according to an embodiment of the present disclosure. The fourth gesture is double-clicking with one finger, and can implement a function such as entering different options in the onboard system or pausing of playing.

As shown in FIG. 5, the gesture of the double-clicking with one finger is used to control an HUD, and can implement a function of entering options of different displayed content. For example, a speed option can be entered by performing the double-clicking with one finger once, then a fuel consumption option can be entered by performing the double-clicking with one finger again, and so on.

As shown in FIG. 5, when the gesture of the double-clicking with one finger is used to control an onboard navigation system, a function of searching for positions of, for example, a merchant near a current position or a target building of the user, can be implemented. For example, a position of a merchant or another building can be viewed by performing the double-clicking with one finger once, and then a different merchant or building can be switched to by performing the double-clicking with one finger again.

As shown in FIG. 5, when the double-clicking with one finger is used to control display of an onboard menu, a function of entering a specific option in the menu can be implemented.

As shown in FIG. 5, when the double-clicking with one finger is used to control a multimedia system, a function of pausing can be implemented. For example, when a song is played, the double-clicking with one finger can pause playing.

Figure 6:
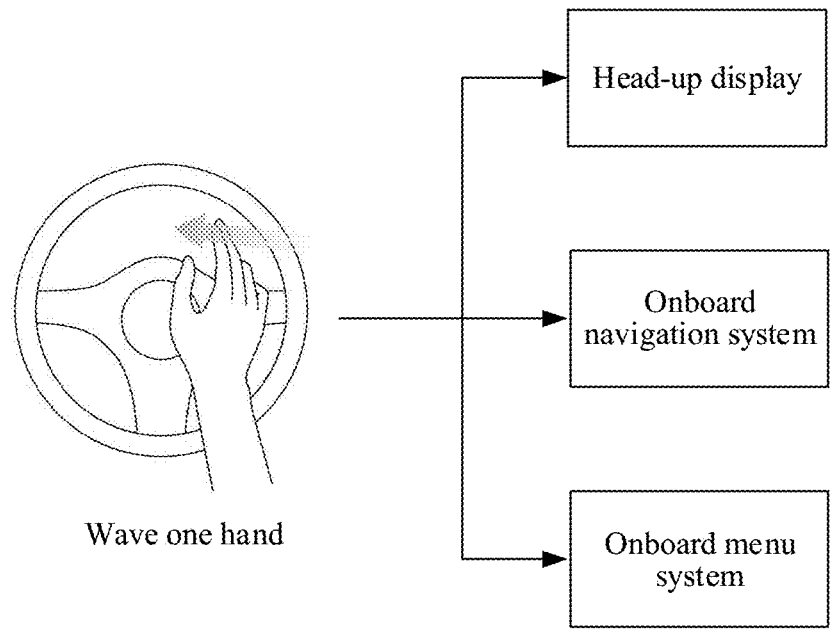
FIG. 6 is a schematic diagram of application of a fifth gesture according to an embodiment of the present disclosure.

FIG. 6 is a schematic diagram of application of a fifth gesture according to an embodiment of the present disclosure. The fifth gesture is waving one hand, and can control switching between different applications or different modes in the onboard system.

As shown in FIG. 6, when the gesture of the waving one hand is used to control an HUD, different displayed content can be switched by performing the gesture. For example, when the HUD currently displays real-time fuel consumption, average fuel consumption can be switched to by performing the waving one hand.

As shown in FIG. 6, when the gesture of the waving one hand is used to control an onboard central control screen, different applications on the onboard central control screen can be switched by performing the waving one hand. For example, when the onboard central control screen currently displays a map of onboard navigation, another application such as radio broadcasting can be switched to by performing the waving one hand.

As shown in FIG. 6, when the gesture of the waving one hand is used to control an onboard menu system, different setting modes can be switched by performing the gesture. For example, when a vehicle is currently in a general mode, a safety mode can be switched to by performing the waving one hand.

As shown in FIG. 6, when the gesture of the waving one hand is used to control a multimedia system, different applications can be switched by performing the gesture. For example, when the multimedia system currently plays music, music playing can be switched to video playing, an image, or the like by performing the waving one hand.

Figure 7:
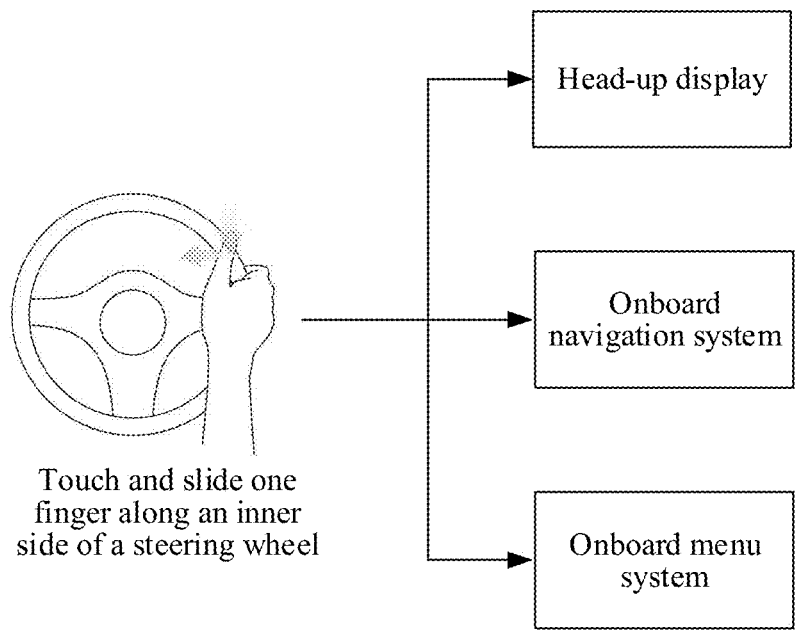
FIG. 7 is a schematic diagram of application of a sixth gesture according to an embodiment of the present disclosure.

FIG. 7 is a schematic diagram of application of a sixth gesture according to an embodiment of the present disclosure. The sixth gesture is touching and sliding one finger along an inner side of the steering wheel, and can implement a function of returning to a previous menu or exiting from an application.

As shown in FIG. 7, when the gesture of the touching and sliding one finger along an inner side of the steering wheel is used to control an HUD, a previous menu can be returned to from current displayed content by performing the gesture.

As shown in FIG. 7, when the gesture of the touching and sliding one finger along an inner side of the steering wheel is used to control an onboard navigation system, the onboard navigation system can be exited from by performing the gesture.

As shown in FIG. 7, when the gesture of the touching and sliding one finger along an inner side of the steering wheel is used to control an onboard menu system, the onboard menu system can be exited from by performing the gesture.

As shown in FIG. 7, when the gesture of the touching and sliding one finger along an inner side of the steering wheel is used to control a multimedia system, the multimedia system can be exited from by performing the gesture.

Figure 8:
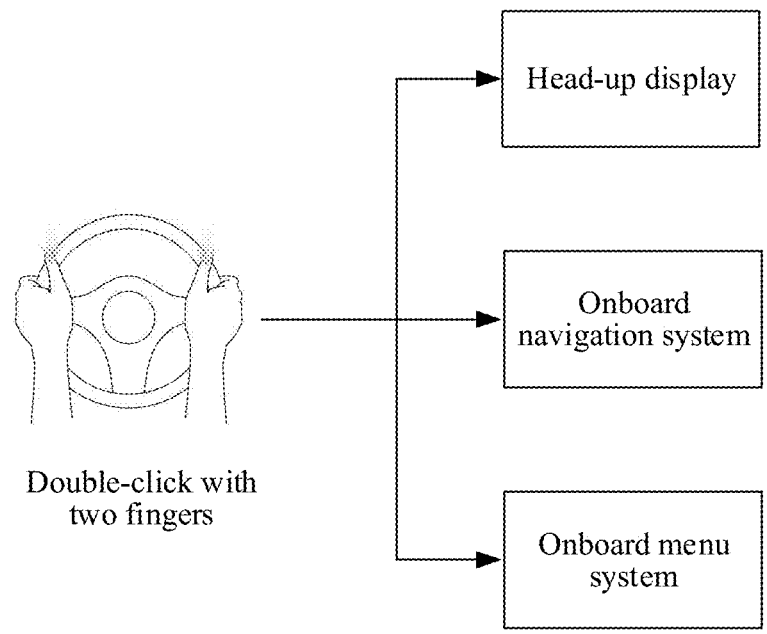
FIG. 8 is a schematic diagram of application of a seventh gesture according to an embodiment of the present disclosure.

FIG. 8 is a schematic diagram of application of a seventh gesture according to an embodiment of the present disclosure. The seventh gesture is double-clicking with two fingers, and can implement functions of closing an application and starting or stopping a gesture identification mode.

As shown in FIG. 8, when the gesture of the double-clicking with two fingers is used to control an HUD, the HUD can be directly closed by performing the gesture, or the gesture identification modes can be opened or closed in turn by performing the gesture.

As shown in FIG. 8, when the gesture of the double-clicking with two fingers is used to control display of onboard navigation, a navigation mode can be directly closed by performing the gesture, or the gesture identification modes can be opened or closed in turn by performing the gesture.

As shown in FIG. 8, when the gesture of the double-clicking with two fingers is used to control display of an onboard menu, the gesture identification modes can be opened or closed by performing the gesture.

As shown in FIG. 8, when the gesture of the double-clicking with two fingers is used to control a multimedia system, the gesture identification modes can be opened or closed by performing the gesture.

Optionally, in some embodiments, when the gesture identification modes need to be switched between a plurality of display modes, for example, be switched from an HUD to an onboard navigation display mode, previous menus can be returned to level by level by performing a gesture of touching and sliding along the inner side of the steering wheel, till returning to a top-level menu. After the top-level menu is returned to, the gesture of touching and sliding along the inner side of the steering wheel is performed again. An onboard central control display screen presents a selection menu of a plurality of modes, for example, a selection menu presenting four modes, namely, the HUD, the onboard navigation display mode, an onboard menu display mode, and a multimedia display mode. In this case, different modes may be selected by performing a gesture of sliding one finger upward, downward, leftward, and rightward.

Optionally, in some embodiments, the circumference of the steering wheel is provided with a plurality of sound holes. The plurality of sound holes are in one-to-one correspondence with the ultrasonic sensors.

Figure 9:
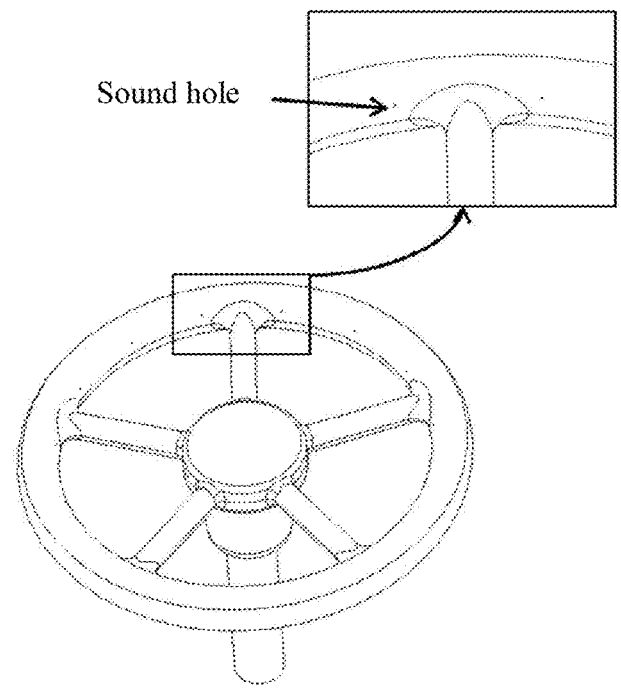
FIG. 9 is a schematic diagram of sound holes provided on the circumference of a steering wheel according to an embodiment of the present disclosure.

FIG. 9 is a schematic diagram of sound holes provided on circumference of a steering wheel according to an embodiment of the present disclosure.

As shown in FIG. 9, there may be a plurality of sound holes. The plurality of sound holes are evenly distributed on the circumference of the steering wheel.

Optionally, in some embodiments, when the sensors are ultrasonic sensors, a quantity of the sound holes is at least two.

Optionally, in some embodiments, the sound holes are in one-to-one correspondence with the ultrasonic sensors.

Figure 10:
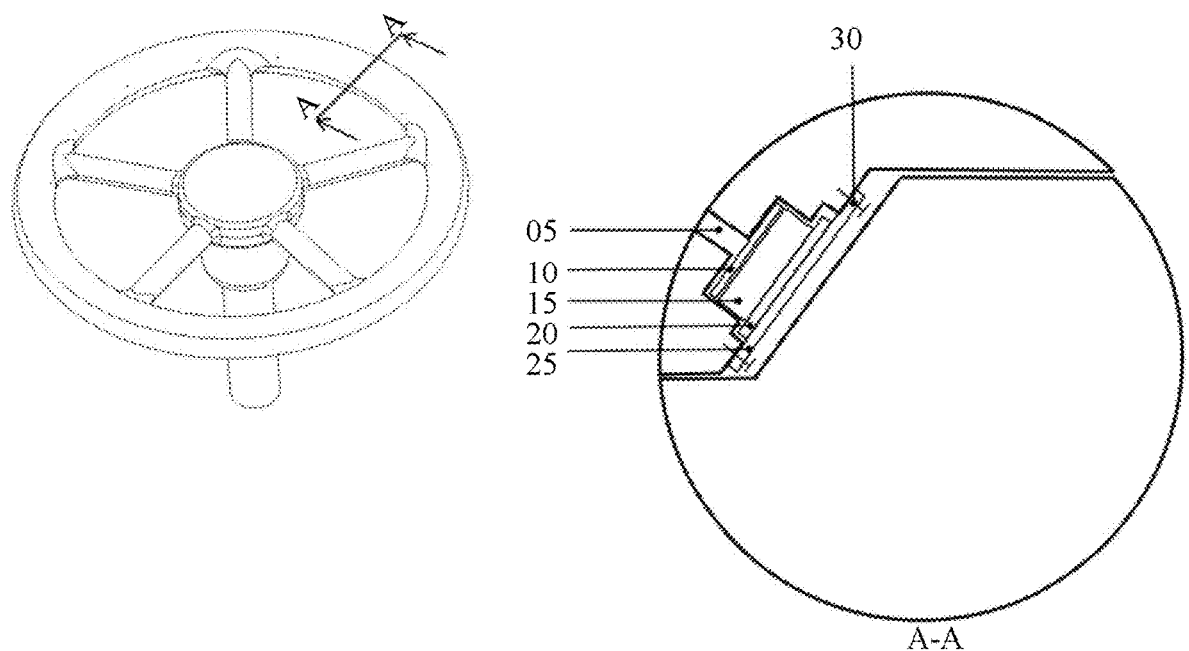
FIG. 10 is a schematic diagram of an ultrasonic sensor mounted in a steering wheel according to an embodiment of the present disclosure.

FIG. 10 is a schematic diagram of an ultrasonic sensor mounted in a steering wheel according to an embodiment of the present disclosure.

As shown in FIG. 10, a waterproof ventilation film 10 is disposed between a sound hole 05 and an ultrasonic sensor 15. The waterproof ventilation film is configured to prevent water vapor, for example, sweat on a hand of the driver or water vapor in the air, from entering the ultrasonic sensor 15 through the sound hole 05 and affecting normal working of the ultrasonic sensor 15.

Optionally, in some embodiments, the ultrasonic sensor 15 is mounted on a flexible printed circuit board (FPCB) 20 through a surface-mount technology (SMT).

Figure 11:
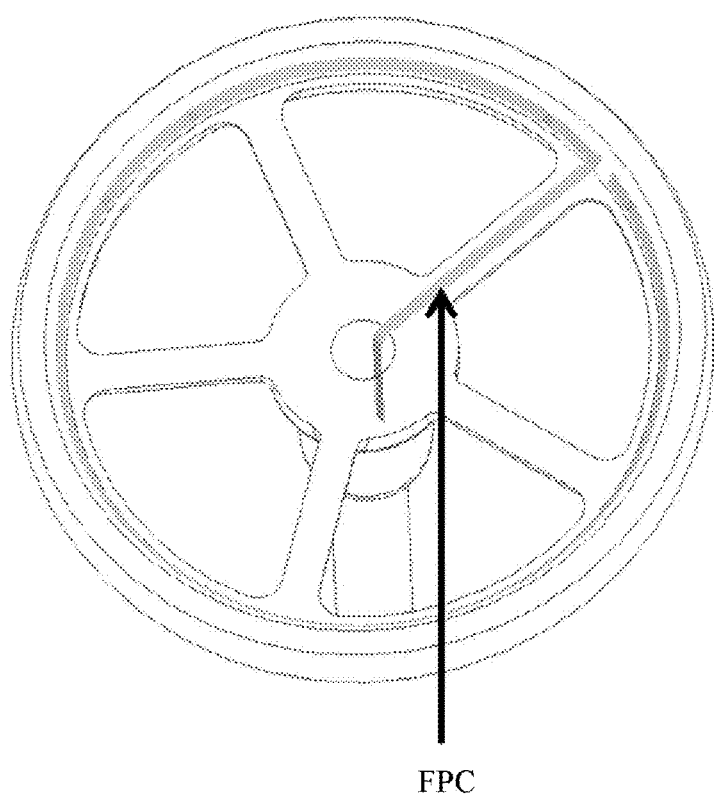
FIG. 11 is a schematic diagram of a layout form of a flexible printed circuit board (FPCB) according to an embodiment of the present disclosure.

FIG. 11 is a schematic diagram of a layout form of a flexible printed circuit board FPC according to an embodiment of the present disclosure.

As shown in FIG. 11, the FPC is cabled into a shaft of the steering wheel through a circumference bracket of the steering wheel, to implement a connection to a microprocessor.

As shown in FIG. 10, a reinforcing plate 25 is mounted behind the FPC 20. The reinforcing plate 25 is configured to reinforce the ultrasonic sensor, and fasten the ultrasonic sensor 15 and the FPC 20 through a screw 30.

As shown in FIG. 10, a direction of the sound hole 05 may be determined based on an active area of a hand or a finger of the driver and a field of view (FOV) of the ultrasonic sensor, namely, coverage of an ultrasonic signal.

Figure 12:
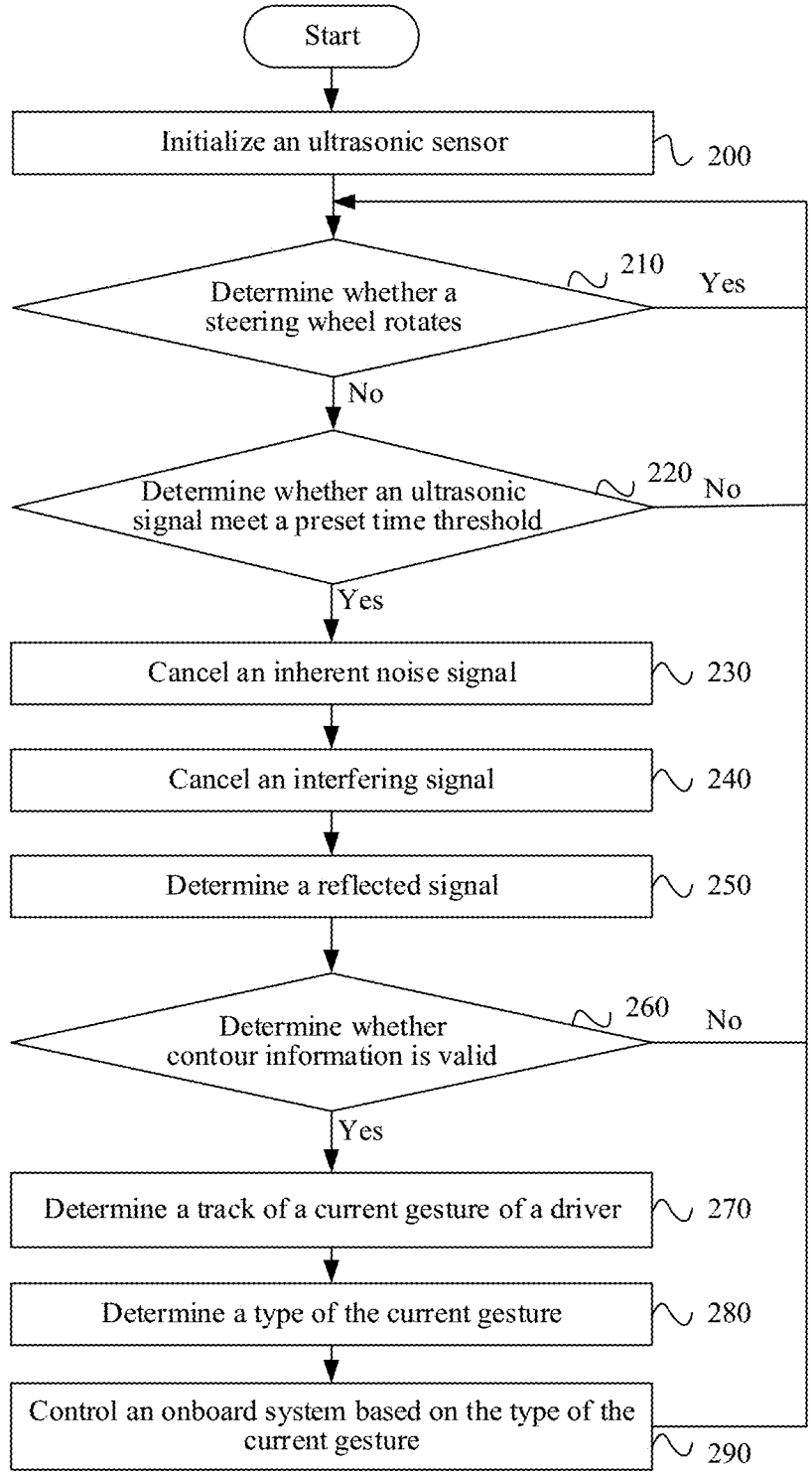
FIG. 12 is another schematic flowchart of a method for controlling an onboard system according to an embodiment of the present disclosure.

FIG. 12 is a schematic flowchart of a method 200 for controlling an onboard system according to an embodiment of the present disclosure. In the method 200, a sensor mounted in a steering wheel is an ultrasonic sensor. As shown in FIG. 12, the method 200 includes some or all of the following steps.

200: Initialize an ultrasonic sensor.

Optionally, in some embodiments, the initialization includes powering on the ultrasonic sensor, and setting a parameter of the ultrasonic sensor, for example, setting a sampling time length of the ultrasonic sensor, and setting an interrupt of the ultrasonic sensor.

210: Determine whether a steering wheel is in a rotation state.

Optionally, in some embodiments, a gyroscope may be mounted in the steering wheel. The gyroscope may determine, based on data information collected by the gyroscope, whether the steering wheel is in the rotation state. When the steering wheel is in the rotation state, an ultrasonic signal sent by the ultrasonic sensor may not need to be collected. To be specific, a gesture performed by a driver is not identified, to ensure precision of gesture identification.

220: Predetermine ultrasonic signals.

Optionally, in some embodiments, after a receive end of the ultrasonic sensor receives the ultrasonic signals within a period of time, the ultrasonic signals within the period of time may be predetermined to determine whether time lengths from sending the ultrasonic signals to receiving the ultrasonic signals meet a preset condition. The preset condition is that the time lengths from sending the ultrasonic signals to receiving the ultrasonic signals are greater than or equal to a preset time threshold. When the time lengths meet the preset condition, the received ultrasonic signals may be stored and further processed. When the time lengths do not meet the preset condition, the ultrasonic sensor does not store the current ultrasonic signals, and receives and predetermines ultrasonic signals in a next period time again.

In this embodiment of the present disclosure, ultrasonic signals are predetermined to remove, in advance, a signal in the ultrasonic signals that is useless for gesture identification, and ensure gesture identification accuracy.

230: Cancel inherent noise signals.

Optionally, in some embodiments, the inherent noise signals may be noise signals of a vehicle engine or noise signals of another mechanical structure.

Optionally, in some embodiments, time domain and frequency domain transformation may be performed on the noise signals having natural frequencies. Then, the noise signals having the natural frequencies are filtered out using a band-pass filter.

240: Cancel an interference signal.

Optionally, in some embodiments, the interference signal is not a signal sent by an ultrasonic sensor. Therefore, the interference signal is an unwanted signal for identification of the gesture of the driver. Time domain and frequency domain transformation may be performed on the interference signal. The interference signal is filtered out using the band-pass filter, and only an ultrasonic signal sent by the ultrasonic sensor is reserved.

250: Determine reflected signals.

Optionally, in some embodiments, after the inherent noise signals and the interference signal are filtered out, remaining signals in the ultrasonic signals are all signals sent by the ultrasonic sensor. The ultrasonic signals include direct signals and reflected signals. The direct signals are sent from a transmit end of the ultrasonic sensor, and directly enter a receive end of the ultrasonic sensor without being reflected by any object. Therefore, the direct signals are unwanted signals for gesture identification. The reflected signals are signals sent from the transmit end of the ultrasonic sensor and entering the receive end after being reflected by an object. The object reflecting ultrasonic may be a hand or a finger of the driver, or may be another object. In the reflected signals, signals reflected by the hand or the finger of the driver are final wanted signals for gesture identification.

Optionally, in some embodiments, propagation distances of the ultrasonic signals may be calculated using phase differences and delay parameters of the ultrasonic signals, and then the reflected signals in the ultrasonic signals are determined based on different propagation distances. After the reflected signals are determined, propagation distances of the reflected signals may be calculated using phase differences and delay parameters of the reflected signals, thereby determining a signal in the reflected signals that is reflected by the hand or the finger of the driver, to be specific, a reflected signal in an active area of the hand or the finger of the driver. The signal is a final wanted signal for gesture identification.

260: Determine contour information of a current gesture at a moment based on position information of the reflected signals at the moment, and determine whether the contour information is valid.

The position information of the reflected signals in the active area of the hand or the finger of the driver at the moment is determined using the reflected signals. The contour information of the current gesture at the moment is determined based on the position information. The contour information is compared with pre-stored contour information. When a similarity is greater than or equal to a preset threshold, the contour information may be considered as valid contour information. To be specific, the contour information is contour information of a hand or a finger of a person, thereby subsequent processing on the reflected signals is performed, to determine a gesture represented by the reflected signals. If the contour information is invalid, the subsequent processing may not be performed on the reflected signals, to reduce gesture identification time.

The contour information of the hand or the finger of the driver is determined, to determine whether the obtained reflected signals are reflected signals reflected by the hand or the finger of the driver, thereby further ensuring gesture identification accuracy.

270: Determine a track of the current gesture of the driver.

Optionally, in some embodiments, after the reflected signals are determined from the ultrasonic signals, the hand or the finger of the driver within the period of time may be positioned based on the reflected signals within the period of time. For example, coordinates of a position of the hand or the finger of the driver within the period of time may be determined according to the ultrasonic multipoint positioning principle.

Optionally, in some embodiments, after the hand or the finger of the driver within the period of time is positioned, the track of the current gesture of the driver may be determined based on obtained position information. For example, function fitting may be performed on the coordinates of the position of the hand or the finger of the driver within the period of time, to obtain a fitted function curve. The fitted function curve is the track of the current gesture of the driver.

280: Determine a type of the current gesture.

Optionally, in some embodiments, the type of the current gesture may be determined from the preset gesture types based on the determined track of the current gesture.

For example, the function curve of the track of the current gesture may be compared with function curves in a database, and a function curve having a highest matching degree with the function curve of the track of the current gesture is selected from the function curves in the database. A gesture type corresponding to the function curve having the highest matching degree is the type of the current gesture.

Optionally, in some embodiments, the preset gesture types may include at least one of the following gesture types:

sliding two fingers inward or outward;
sliding two fingers clockwise or anticlockwise;
sliding one finger upward, downward, leftward, and rightward;
double-clicking with one finger;
waving one hand;
touching and sliding one finger along an inner side of circumference of the steering wheel; and
double-clicking with two fingers.

290: Control an onboard system based on the type of the current gesture, to perform an operation corresponding to the type of the current gesture.

The onboard system in this embodiment of the present disclosure may be an onboard HUD, an onboard navigation system, an onboard menu system, and an onboard multimedia system, or another onboard system. This is not limited in this embodiment of the present disclosure.

Method embodiments of the embodiments of the present disclosure are described in detail above with reference to FIG. 1 to FIG. 12. The following describes embodiments of an apparatus for controlling an onboard system in the embodiments of the present disclosure in detail with reference to FIG. 13 and FIG. 14. It should be noted that the embodiments of the apparatus for controlling an onboard system correspond to the method embodiments. For similar descriptions, refer to the method embodiments.

Figure 13:
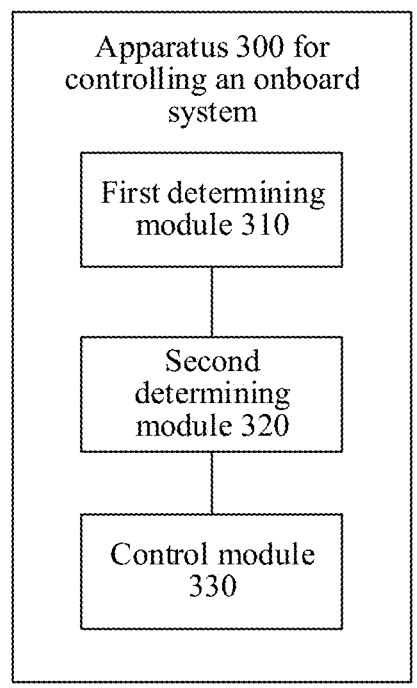
FIG. 13 is a schematic block diagram of an apparatus for controlling an onboard system according to an embodiment of the present disclosure.

FIG. 13 is a schematic block diagram of an apparatus 300 for controlling an onboard system according to an embodiment of the present disclosure. As shown in FIG. 13, the apparatus includes some or all of the following modules such as a first determining module 310 configured to determine, using a sensor mounted in a steering wheel, a track of a current gesture of a driver in a process of holding, by the driver, the steering wheel; a second determining module 320 configured to determine a type of the current gesture from preset gesture types based on the track of the current gesture; and a control module 330 configured to control the onboard system to perform an operation corresponding to the type of the current gesture.

Further, when the driver holds the steering wheel using a hand, types of some gestures performed by the driver may be identified using the sensor mounted in the steering wheel, and operations corresponding to different types of gestures are performed on the onboard system based on the types of the gestures. In the entire process, the hand of the driver may remain in a state of holding the steering wheel, some gestures need to be performed using only some fingers or one hand of the driver such that different function operations can be implemented, some function operation requirements of the driver during driving of a vehicle are greatly facilitated, driving safety is ensured, and interaction between the vehicle and a human is closer.

It should be understood that the onboard system in this embodiment of the present disclosure may be an onboard HUD, or may be an onboard navigation system, an onboard menu system, and an onboard multimedia system, or another onboard system. This is not limited in this embodiment of the present disclosure.

Optionally, in some embodiments, the sensor may be mounted on circumference of the steering wheel.

Optionally, in some embodiments, there may be a plurality of sensors. The plurality of sensors are connected in series to form a sensor array.

It should be understood that a specific quantity of the sensors may be determined by a size of the steering wheel, or may be determined by precision needed for gesture identification. For example, when a gesture performed by the driver needs to be precisely identified, the quantity of the sensors may be properly increased.

Optionally, in some embodiments, the sensor may be an ultrasonic sensor.

Optionally, in some embodiments, there may also be a plurality of ultrasonic sensors. A specific quantity of the plurality of ultrasonic sensors may be determined by a size of the steering wheel, or may be determined by precision of gesture identification. The plurality of ultrasonic sensors are connected in series to form an ultrasonic sensor array.

It should be understood that a gesture is identified according to an ultrasonic multipoint positioning principle. Therefore, the quantity of the ultrasonic sensors is at least two.

It should be understood that when the sensor is the ultrasonic sensor, the ultrasonic sensor may be used as a transmit end, or may be used as a receive end.

Optionally, in some embodiments, when the sensor is the ultrasonic sensor, the ultrasonic sensor is further configured to obtain ultrasonic signals collected by the plurality of ultrasonic sensors within a period of time; select a reflected signal from the collected ultrasonic signals; and position a hand or a finger of the driver within a period of time based on the selected reflected signal, to determine the track of the current gesture.

Optionally, in some embodiments, the apparatus 300 further includes a third determining module 340. The third determining module 340 is configured to determine whether the steering wheel is in a rotation state.

Optionally, in some embodiments, the preset gesture types include at least one of the following gesture types:
sliding two fingers inward or outward;
sliding two fingers clockwise or anticlockwise;
sliding one finger upward, downward, leftward, and rightward;
double-clicking with one finger;
waving one hand;
touching and sliding one finger along an inner side of circumference of the steering wheel; and
double-clicking with two fingers.

Optionally, in some embodiments, the circumference of the steering wheel is provided with a plurality of sound holes. The plurality of sound holes are in one-to-one correspondence with the plurality of ultrasonic sensors. Directions of the sound holes are determined based on an active area of a hand or a finger of the driver and coverage of the ultrasonic signals.

Optionally, in some embodiments, a waterproof ventilation film is disposed between the ultrasonic sensors and the sound holes. The waterproof ventilation film is configured to prevent water vapor from entering the ultrasonic sensors through the sound holes.

It should be understood that the apparatus for controlling an onboard system according to this embodiment of the present disclosure may correspond to the method for controlling an onboard system in the embodiments of the present disclosure, and the foregoing and other operations and/or functions of the modules of the apparatus 300 for controlling an onboard system respectively implement corresponding procedures of the methods in FIG. 1 and FIG. 12. For brevity, details are not described herein again.

Figure 14:
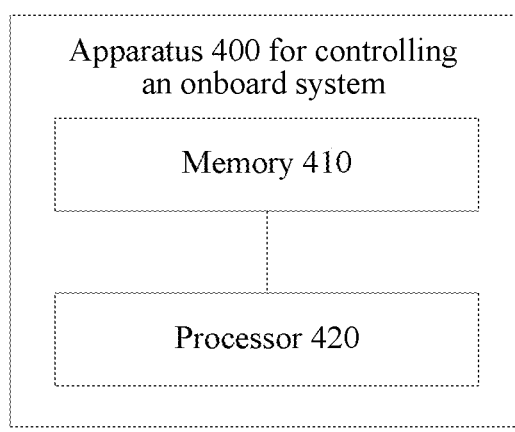
FIG. 14 is another schematic block diagram of an apparatus for controlling an onboard system according to an embodiment of the present disclosure.

FIG. 14 is schematic structural diagram of an apparatus 400 for controlling an onboard system according to an embodiment of the present disclosure. As shown in FIG. 14, the apparatus 400 includes a memory 410 and a processor 420. The memory 410 and the processor 420 communicate with each other and transfer a control and/or data signal through an internal connection path.

The memory 410 is configured to store program code.

The processor 420 is configured to invoke the program code to implement the method in the foregoing embodiments in the embodiments of the present disclosure.

In this embodiment of the present disclosure, the processor 420 may be a central processing unit (CPU), a network processor (NP), or a combination of a CPU and an NP. The processor may further include a hardware chip. The foregoing hardware chip may be an application-specific integrated circuit (ASIC), a programmable logic device (PLD), or a combination thereof.

An embodiment of the present disclosure provides a computer-readable storage medium configured to store code of computer program. The computer program includes an instruction used to perform the method for controlling an onboard system in the embodiments of the present disclosure in FIG. 1 to FIG. 12. The readable storage medium may be a read-only memory (ROM) or a random-access memory (RAM). This is not limited in this embodiment of the present disclosure.

All or some of the embodiments of the present disclosure may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the processes or functions according to the embodiments of the present disclosure are produced. The computer may be a general-purpose computer, a dedicated computer, a computer network, or other programmable apparatuses. The computer instructions may be stored in a computer-readable medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, a magnetic tape), an optical medium (for example, a digital video disc (DVD)), or a semiconductor medium (for example, a solid-state disk (SSD)), or the like.

It should be understood that the apparatus for controlling an onboard system according to this embodiment of the present disclosure may correspond to the method for controlling an onboard system in the embodiments of the present disclosure, and the foregoing and other operations and/or functions of the modules of the apparatus 400 for controlling an onboard system respectively implement corresponding procedures of the methods in FIG. 1 and FIG. 12. For brevity, details are not described herein again.

It should be understood that the term "and/or" in this specification describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments of the present disclosure essentially, or the part contributing to other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the embodiments of the present disclosure, but are not intended to limit the protection scope of the embodiments of the present disclosure. Any variation or replacement readily figured out by a person skilled in the art within the technical scope disclosed in the embodiments of the present disclosure shall fall within the protection scope of the embodiments of the present disclosure. Therefore, the protection scope of the embodiments of the present disclosure shall be subject to the protection scope of the claims.

What is claimed is:

1. A method for controlling an onboard system in a vehicle, comprising:
   determining whether a steering wheel of the vehicle is in a rotation state;
   obtaining ultrasonic signals reflected from a portion of an object of a driver contacting the steering wheel using a plurality of ultrasonic sensors when the steering wheel is in a non-rotation state, wherein the ultrasonic signals are obtained during a period of time, wherein the plurality of ultrasonic sensors is mounted in the steering wheel, and wherein the object is a hand or a finger of the driver;
   determining coordinates of a position of the object within the period of time using the ultrasonic signals;
   determining, using the ultrasonic signals and by performing function fitting on the coordinates, a track of the object as a current gesture of the driver;
   determining, according to the track, a gesture type of the current gesture from preset gesture types; and
   controlling the onboard system to perform an operation, wherein the operation corresponds to the gesture type.

2. The method of claim 1, further comprising determining whether the steering wheel is in the rotation state using a status of a gyroscope in the steering wheel.

3. The method of claim 1, wherein the preset gesture types comprise at least one of the following gesture types:
   sliding two fingers either inward or outward;
   sliding two fingers either clockwise or anticlockwise;
   sliding one finger either upward, downward, leftward, or rightward;
   double-clicking the steering wheel with one finger;
   waving one hand;
   touching and sliding one finger along an inner side of a circumference of the steering wheel; or
   double-clicking the steering wheel with two fingers.

4. The method of claim 1, further comprising determining directions of sound holes in a circumference of the steering wheel based on an active area of the hand and coverage of the ultrasonic signals, wherein the sound holes correspond with the ultrasonic sensors.

5. The method of claim 1, wherein before determining the track, the method further comprises:
   determining contour information of the object at a first time in the period of time using the ultrasonic signals at the first time; and
   determining whether the contour information is valid by comparing the contour information with pre-stored contour information.

6. The method of claim 1, further comprising obtaining a fitted function curve as the current gesture of the driver by performing the function fitting.

7. The method of claim 1, wherein the onboard system comprises an onboard head-up display (HUD) or an onboard navigation system.

8. The method of claim 1, wherein the onboard system comprises an onboard menu system or an onboard multimedia system.

9. An apparatus for controlling an onboard system in a vehicle, comprising:

a memory configured to store instructions; and
a processor coupled to the memory and configured to execute the instructions to cause the apparatus to:
determine whether a steering wheel of the vehicle is in a rotation state;
obtain ultrasonic signals reflected from a portion of an object of a driver contacting the steering wheel using a plurality of ultrasonic sensors when the steering wheel is in a non-rotation state, wherein the ultrasonic signals are obtained during a period of time, wherein the plurality of ultrasonic sensors is mounted in the steering wheel, and wherein the object is a hand or a finger of the driver;
determine coordinates of a position of the object within the period of time using the ultrasonic signals;
determine, using the ultrasonic signals and based by performing function fitting on the coordinates, a track of the object as a current gesture of the driver;
determine, according to the track, a gesture type of the current gesture from preset gesture types; and
control the onboard system to perform an operation, wherein the operation corresponds to the gesture type.

10. The apparatus of claim 9, wherein the instructions further cause the processor to determine whether the steering wheel is in the rotation state using a status of a gyroscope in the steering wheel.

11. The apparatus of claim 9, wherein the preset gesture types comprise at least one of the following gesture types:
sliding two fingers either inward or outward;
sliding two fingers either clockwise or anticlockwise;
sliding one finger either upward, downward, leftward, or rightward;
double-clicking the steering wheel with one finger;
waving one hand;
touching and sliding one finger along an inner side of a circumference of the steering wheel; or
double-clicking the steering wheel with two fingers.

12. The apparatus of claim 9, wherein a circumference of the steering wheel is provided with a plurality of sound holes, wherein the plurality of sound holes is in one-to-one correspondence with the plurality of ultrasonic sensors, and wherein directions of the sound holes are determined based on an active area of the hand or the finger and coverage of the ultrasonic signals.

13. The apparatus of claim 9, wherein the instructions further cause the processor to:
determine contour information of the object at a first time in the period of time using the ultrasonic signals at the first time; and
determine whether the contour information is valid by comparing the contour information with pre-stored contour information.

14. A computer program product comprising computer-executable instructions stored on a non-transitory computer readable storage medium that, when executed by a processor, cause an apparatus to:
determine whether a steering wheel of a vehicle is in a rotation state;
obtain ultrasonic signals reflected from a portion of an object of a driver contacting the steering wheel using a plurality of ultrasonic sensors when the steering wheel is in a non-rotation state, wherein the ultrasonic signals are obtained during a period of time, wherein the plurality of ultrasonic sensors is mounted in the steering wheel, and wherein the object is a hand or a finger of the driver;
determine coordinates of a position of the object within the period of time using the ultrasonic signals;
determine, using the ultrasonic signals and by performing function fitting on the coordinates, a track of the object as a current gesture of the driver;
determine, according to the track, a gesture type of the current gesture from preset gesture types; and
control an onboard system in the vehicle to perform an operation,
wherein the operation corresponds to the gesture type.

15. The computer program product of claim 14, wherein the computer-executable instructions further cause the apparatus to determine whether the steering wheel is in the rotation state using a status of a gyroscope in the steering wheel.

16. The computer program product of claim 14, wherein the preset gesture types comprise at least one of the following gesture types:
sliding two fingers either inward or outward;
sliding two fingers either clockwise or anticlockwise;
sliding one finger either upward, downward, leftward, or rightward;
double-clicking the steering wheel with one finger;
waving one hand;
touching and sliding one finger along an inner side of a circumference of the steering wheel; or
double-clicking the steering wheel with two fingers.

17. The computer program product of claim 14, wherein a circumference of the steering wheel is provided with a plurality of sound holes, wherein the plurality of sound holes is in one-to-one correspondence with the plurality of ultrasonic sensors, and wherein directions of the sound holes are determined based on an active area of the hand or the finger and coverage of the ultrasonic signals.

18. The computer program product of claim 14, wherein the computer instructions further cause the apparatus to obtain a fitted function curve as the current gesture of the driver by performing the function fitting.

19. The computer program product of claim 14, wherein the computer instructions further cause the apparatus to:
determine contour information of the object at a first time in the period of time using the ultrasonic signals at the first time; and
determine whether the contour information is valid by comparing the contour information with pre-stored contour information.

20. The computer program product of claim 14, wherein the onboard system comprises an onboard head-up display (HUD), an onboard navigation system, an onboard menu system, or an onboard multimedia system.

* * * * *

UNITED STATES PATENT AND TRADEMARK OFFICE
CERTIFICATE OF CORRECTION

PATENT NO. : 11,847,265 B2
APPLICATION NO. : 17/577731
DATED : December 19, 2023
INVENTOR(S) : Xinyu Zhao et al.

Page 1 of 1

It is certified that error appears in the above-identified patent and that said Letters Patent is hereby corrected as shown below:

In the Claims

Claim 9, Column 21, Line 16: "and based by" should read "and by"

Signed and Sealed this
Thirteenth Day of February, 2024

Katherine Kelly Vidal
*Director of the United States Patent and Trademark Office*